United States Patent Office 3,716,528
Patented Feb. 13, 1973

3,716,528
DERIVATIVES OF IBOGAMINE, IBOGAINE AND IBOGALINE LACTAMS
Wataru Nagata, Nishinomiya, and Shoichi Hirai, Ibaraki, Japan, assignors to Shionogi & Co., Ltd., Osaka, Japan
No Drawing. Original application May 28, 1968, Ser. No. 732,520, now Patent No. 3,663,940. Divided and this application Oct. 14, 1970, Ser. No. 80,806
Claims priority, application Japan, June 3, 1967, 42/35,647; Feb. 7, 1968, 43/7,620
Int. Cl. C07d 43/38
U.S. Cl. 260—239.3 P      10 Claims

ABSTRACT OF THE DISCLOSURE

Lactams of ibogamine, ibogaine and ibogaline compounds, such as 4-desethyl-18-p-toluensulfonyloxyibogamine lactam, are provided, which are useful as intermediates in preparing isoquinuclidine alkaloids useful as medicaments.

This application is a division of Ser. No. 732,520 filed May 28, 1968, now U.S. Pat. No. 3,663,940.

The present invention relates to a process for the preparation of a series of known and useful alkaloids of isoquinuclidine-type, particularly the components of the iboga plants such as ibogamine, ibogaine, ibogaline, or the homologues, which is characterized by totally synthesizing the said compounds briefly and stereospecifically utilizing the peculiar and advantageous reactivity of novel and unusual cyclic compounds, i.e. 1-azatricyclo[3.2.1.0$^{2,7}$]octanes and the homologues (I) which have been prepared by the present inventors. Most advantageously the present invention provides an improved method for the preparation of these alkaloids useful as medicaments.

The process of the present invention comprises interacting a starting aziridine compound (I) with an indoleacetic acid anhydride (II) followed by hydrolysis to give an isoquinuclidine (III) [the 1st step], oxidizing the latter to give a compound (IV) [the 2nd step], interacting the latter with an organic acid to give a compound (V) [the 3rd step], subjecting to solvolysis the latter to give a compound (VI) [the 4th step], reducing the latter with a metal hydride to give a vinyl amine (VII) [the 5th step], catalytically hydrogenating the latter to give a compound (VIII) [the 6th step], and then treating the latter with a metal hydride to give the final compound (IX) [the 7th step], or, alternatively in the 3rd step in the above-described process, interacting the compound (IV) with an acid in the presence of a lower alcohol directly to give the compound (VI) corresponding to the product of the 4th step [the 3rd step], or in the 4th step, reducing the compound (V) with an aluminum hydride represented by the general formula AlH·Z·Z' (wherein Z and Z' are the same or different and each is a hydrogen atom, a lower alkyl group, e.g. methyl, ethyl, propyl, i-propyl, butyl, i-butyl, a lower alkoxy group, e.g. methoxy, ethoxy, propoxy, i-propoxy, butoxy, i-butoxy, t-butoxy, or a halogen atom, e.g. chlorine, bromine, iodine) directly to give the final compound (IX) [4'th step] and/or the intermediate (X), being catalytically hydrogenated to the final compound (IX) [4''th step]. The reaction sequence is represented by the following reaction scheme.

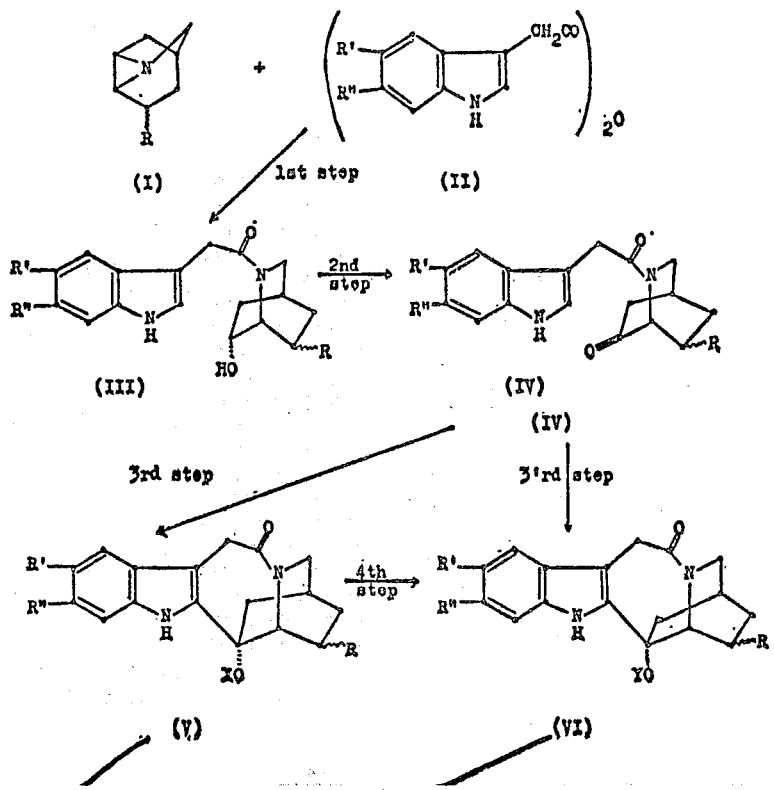

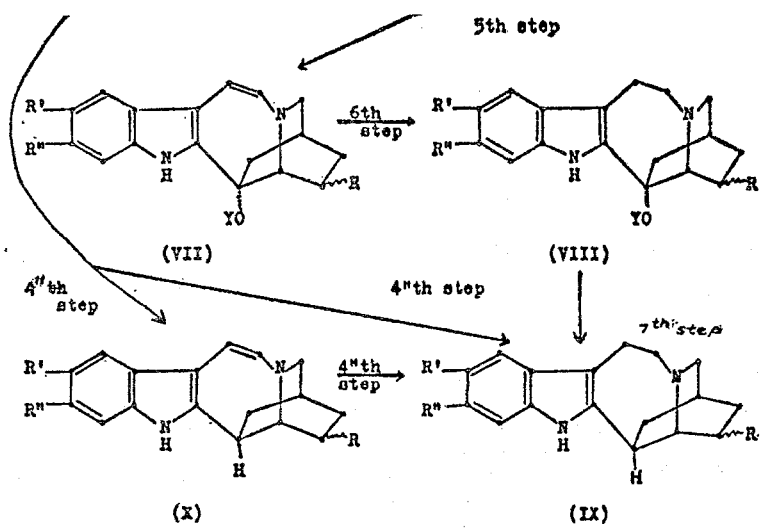

(wherein R is a hydrogen atom or a lower alkyl group, e.g. methyl, ethyl, propyl, butyl; R' and R" are the same or different and each is a hydrogen atom or a lower alkoxy group, e.g. methoxy, ethoxy, propoxy; X is an organic acid residue, e.g. p-toluenesulfonyl group; and Y is a lower alkyl group, e.g. methyl, ethyl, propyl)

The starting compounds (I) are novel ones and may be prepared by reacting a 3-cyclohexene-1-methylamine (XI) with lead tetraacetate.

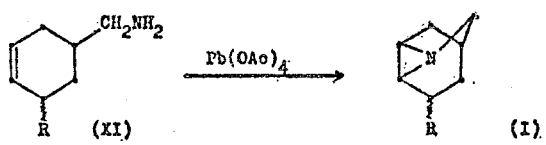

The first step consists of two stages and the former stage is carried out by reacting a compound (I) with a compound (II), if necessary, in a suitable amount of anhydrous organic solvent to give an ester intermediate of the compound (III). As organic solvent, inert solvents inactive to the reactive compounds, i.e. the compound (I) and the compound (II), for example, an alcohol (e.g. methanol, ethanol), t-butanol, an ether (e.g. diethyl ether, tetrahydrofuran, dioxane, diglyme), a ketone (e.g. acetone, methyl ethyl ketone), an amine (e.g. pyridine, picoline), dimethylsulfoxide, N,N-dimethylformamide, acetonitrile, dichloromethane, chloroform, or the like, may optionally be used. The reaction proceeds readily without specially heating, and may be carried out in the wide range of temperature, such as the ice-cooling temperature to the refluxing temperature of the reaction medium. The reaction period is about one hour or a few days, which may be varied according to the reaction conditions.

In the latter stage of the first step, the resulting ester derivatives are hydrolyzed according to the conventional procedure of hydrolysis of an organic acid ester with an alkali, e.g. an alkali metal hydroxide such as sodium hydroxide, potassium hydroxide, or a carbonate such as sodium carbonate, sodium bicarbonate, potassium carbonate, potassium bicarbonate.

In the second step, the resulting compounds (III) are oxidized to the corresponding ketones (IV). The oxidation may be achieved by applying the oxidizing method or reagent for converting secondary alcohols to ketones such as N-bromosuccinimide, Oppenauer method, dimethylsulfoxide-acetic anhydride, dimethylsulfoxide-dicyclohexylcarbodiimide (DCC), or the like.

In the third step, the resulting compounds (IV) are subjected to intramolecular cyclization together with acylation by interacting an organic acid. In this case, the reaction proceeds stereospecifically and smoothly and affords the objective cyclic ester derivatives (V) in good yield. The reaction is carried out at an optional temperature, ranging from room temperature to the refluxing temperature of the reaction medium, and completed within several minutes to several hours. As solvent, as far as unaffecting the main reaction, the optional solvents may be used, and particularly aprotic solvents such as hydrocarbon solvents, e.g. benzene, toluene, ether solvents, e.g. diethyl ether, tetrahydrofuran, dioxane, or acetonitrile, or protic solvents such as acetic acid, may be used. As organic acid, most acids, not accompanied by steric hindrance by bulky group, may be used, and in general the acids having the small pKa value are more preferable. In view of this point sulfonic acids, e.g. p-toluenesulfonic acid, methanesulfonic acid, bromobenzenesulfonic acid, are the most advantageous. In this reaction the acid residue X arising from the acid used is introduced into the compounds (V).

In the fourth step, the XO-group in the compounds (V) is displaced by the YO-group by a lower alcohol. The solvolysis is carried out by reacting the compound (V) with a lower alcohol in the presence of an acid catalyst such as a mineral acid, e.g. hydrochloric acid, sulfuric acid, or an organic acid, e.g. p-toluenesulfonic acid, or a base catalyst such as an alkali metal hydroxide, e.g. sodium hydroxide, potassium hydroxide, a metal alkoxide, e.g. sodium methoxide, potassium methoxide, sodium ethoxide, potassium ethoxide, potassium t-butoxide, or a complex metal hydride, e.g. sodium borohydride, potassium borohydride, at a temperature ranging from room temperature to the refluxing temperature of the reaction medium for several hours or several days. Lower alkanols used in the solvolysis are methanol, ethanol, propanol, or the like. In order to avoid the side reaction such as isomerization, the reaction is preferably carried out in basic medium at low temperature as mildly as possible. In this case, the lower alkyl group Y arising from the alcohol used (or alkoxy group when used alkoxide) is introduced into the compounds (VI).

In the fifth step, the lactam ring in the resulting ether derivatives (VI) is reduced with a metal hydride. The complex metal hydrides used in this step are lithium aluminum hydride, lithium diethoxy aluminum hydride, lithium triethoxy aluminum hydride, lithium tri-t-butoxy aluminum hydride, lithium borohydride, or the like. In general the reduction of lactam with metal hydride, e.g. lithium aluminum hydride, directly affords a desoxy derivative (corresponding to the compound VIII), however, in this reaction affords intermediately a carbinol amine, which is farther dehydrated to a vinyl amine (if necessary with alumina or phosphorus oxychloride-pyridine; on the contrary, the reduction with an aluminum hydride, e.g.

aluminum hydride, diisobutyl aluminum hydride, directly affords a desoxy derivative (IX): vide infra). This is suspected to be based on the steric factor arising from the bridgehead carbonylamine system. The reaction may be carried out in an aprotic solvent such as a hydrocarbon solvent, e.g. benzene, toluene, an ether, e.g. diethyl ether, tetrahydrofuran, glyme, diglyme, at optional temperature ranging from low temperature, such as Dry Ice-acetone cooling (ca. −70° C.) to ice-cooling temperature or room temperature, to the refluxing temperature of the reaction medium in the conventional manner.

In the sixth step, the vinyl double bond in the resulting vinyl amine (VII) is catalytically hydrogenated. The reaction may preferably be carried out by shaking or stirring the compound (VII) with a catalyst under hydrogen atmosphere at room temperature according to the usual catalytic hydrogenation procedure. The catalysts used in this step are palladium catalysts such as palladium-charcoal, palladium-barium sulfate, or the like, platinum catalysts, and nickel catalysts.

In the seventh step, the YO-group in the resulting compound (VIII) is reductively eliminated. In practice, the reaction may be carried out according to the same procedure as the fifth step.

Alternatively, in the third step, when the reaction is carried out by interacting the compound (IV) with an optional acid, preferably strong acid having small pKa value (e.g. hydrochloric acid, sulfuric acid, p-toluenesulfonic acid), in the presence of a protic solvent but water, particularly lower alcohol (e.g. methanol, ethanol, propanol), the cyclization is accompanied by the ether formation directly to afford the compound (VI) [3′rd step].

Additionally, in the fourth step of the above-described process, when the compound (V) is reduced with an aluminum hydride, the reaction proceeds advantageously to give the final compound (IX) and/or the intermediate (X) [14′th step]. By this simultaneous elimination of the carbonyl group at the position 7 and the acyloxy group at the position 18, the reaction sequence corresponding to the 4th to 7th steps of the above-described process can effectively be shortened to one-step (or two-step) reaction. As the above-defined aluminum hydride (AlH·Z·Z′), trivalent aluminum compounds having at least one active hydrogen atom, such as aluminum hydride, an alkyl aluminum hydride, e.g. dimethyl aluminum hydride, diethyl aluminum hydride, diisobutyl aluminum hydride, an alkoxy aluminum hydride, e.g. ethoxy aluminum dihydride, diethyl aluminum hydride, a halogenated aluminum hydride, e.g. chloroaluminum dihydride, dichloroaluminum hydride, or the like, may be used. These aluminum hydrides may be added as a pure form or a mixture, or prepared in the reaction medium. As solvent, an ether-type solvent such as diethyl eher, tetrahydrofuran, dioxane, glyme, diglyme, or the like may preferably be used, and other anhydrous inert organic solvents such as hydrocarbon solvents, e.g. benzene, toluene, or the like may also be used. Generally, the reaction is preferably carried out under inert gas such as nitrogen, argon, or the like in the wide range of temperature, such as the Dry-Ice acetone temperature to the refluxing temperature of the reaction medium according to the reduction potential of the reagent used. In a word the reaction may be carried out according to the conventional manner in the metal hydride reduction. Occasionally, in this process, the reduction of the compound (V) with aluminum hydride affords, via a carbinol amine, the intermediate 7,8-dehydro derivative (X) as by-product. However, this dehydro compound may readily be hydrogenated catalytically to the final compound (IX) [4″th step]. The catalytic hydrogenation may be carried out according to the same procedure as the sixth step.

Through the whole process, the substituents R, R′ and R″ may be sustained in the final compounds (IX) intact. On the other hand, the substituents X and Y are eliminated in the steps 4th (or 4′th) and 7th, and therefore as far as not obstructing the reactivity, the optional substituents may be used within the scope of the significance defined above. Where the symbol R represents a lower alkyl group such as methyl, ethyl, or propyl, and the symbols R′ and R″ each represents lower alkoxy group such as methoxy group.

The final products (IX) were identified with the natural products by the comparison of the physical constants such as infrared absorption, mass spectrum, and so forth. For convenience, the following formula provides the numbering of these compounds.

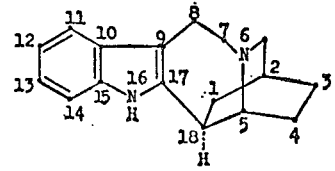

The final compounds (IX) prepared in the present invention exhibit anti-protozoa activity, anti-virus activity, or neutrotropic activity such as analeptic or analgesic activity, and are useful as medicaments. They can be administered in a variety of per se conventional ways, e.g. in the form of tablets constituted e.g. by an effective single dose of active compound of the invention and a major proportion of a per se conventional carrier.

In practice, the present invention will be better explained by the following examples which are not intended to limit the scope of the invention.

EXAMPLE 1

(a) To a solution of 820 mg. of 1-azatricyclo[3.2.1.0$^{2.7}$] octane in 3 ml. of anhydrous ether is added a solution of indoleacetic acid anhydride in anhydrous acetone (3.2 g./15 ml.) and the solution is allowed to stand overnight. The reaction mixture is diluted with ice-water and extracted with dichloromethane and the extract is washed with dilute potassium carbonate aqueous solution and then with water, dried over anhydrous sodium sulfate, and then evaporated to dryness to give 3.37 g. of crude 2-indoleacetyl-6-indoleacetyloxyisoquinuclidine (IR: $\nu_{max.}^{CHCl_3}$ 3560, 3440, 1730, 1623, 1160, 1094 1070, 1030, 1020 cm.$^{-1}$)

A mixture of the above compound, 50 ml. of methanol, and 12 ml. of 2N-potassium carbonate aqueous solution is refluxed for 30 minutes. The reaction mixture is concentrated, diluted with ice-water, and then extracted with dichloromethane. The extract is washed with water, dried and evaporated to dryness, and the resulting residue is crystallized from dichloromethane to give 1.62 g. of 2-indoleacetylisoquinuclidin-6-ol having M.P. 195–196° C.

IR: $\nu_{max.}^{Nujol}$ 3315, 1636, 742 cm.$^{-1}$; $\nu_{max.}^{CHCl_3}$ 3470, 1624, 1090 cm.$^{-1}$ Analysis.—Calcd. for $C_{17}H_{22}N_2O_2$ (percent): C, 71.30; H, 7.74; N, 9.78. Found (percent): C, 71.17; H, 6.93; N, 10.12.

According to the same procedure, the reaction of 1-azatricyclo[3.2.1.0$^{2.7}$] octane with the corresponding amount of 5-methoxyindoleacetic acid anhydride or 5,6-dimethoxyindoleacetic acid anhydride in the presence of potassium carbonate affords, via 2-(5-methoxyindoleacetyl) - 6 - (5 - methoxyindoleacetyloxy)isoquinuclidine or 2-(5,6 - dimethoxyindoleacetyl) - 6 - (5,6 - dimethoxyindoleacetyloxy)isoquinuclidine, 2 - (5 - methoxyindoleacetyl)isoquinuclidin - 6 - ol or 2-(5,6-dimethoxyindoleacetyl)isoquinuclidin-6-ol, respectively.

(b) The above-described oily material, i.e. 2-indoleacetylisoquinuclidin-6-ol (100 mg.) is dissolved in 10 ml. of anhydrous toluene and 3 ml. of cyclohexanone under warming, and a portion of the solvent is distilled off as azeotrope to dry the reaction medium. A solution of 107 mg. of aluminum isopropoxide in 2 ml. of anhydrous toluene is added and the mixture is refluxed for 1 hour under stirring. The reaction mixture is cooled, diluted with dilute hydrochloric acid, and then extracted with dichloromethane. The extract is washed with water, dried over anhydrous sodium sulfate, and evaporated to dryness to give 415 mg. of crude material, which is chromatographed on 4 g. of neutral alumina. Elution with dichloromethane or dichloromethane-methanol (99:1) affords 62 mg. of 2-indoleacetylisoquinuclidin-6-one (IR: $\nu_{max.}^{CHCl_3}$ 3466, 1740, 1635, 1417, 1102 cm.$^{-1}$)

and the elution with dichloromethane-methanol (98:2) or dichloromethane-methanol (95:5) affords 32 mg. of the starting 2-indoleacetylisoquinuclidin-6-ol.

According to the same procedure, 2-(5-methoxyindoleacetyl)isoquinuclidin-6-ol is converted to 2-(5-methoxyindoleacetyl)isoquinuclidin-6-one, and 2-(5,6-dimethoxyindoleacetyl)isoquinuclidin - 6 - ol to 2-(5,6-dimethoxyindoleacetyl)isoquinuclidin-6-one, respectively.

(c) A solution of 52 mg. of 2-indoleacetylisoquinuclidin-6-one and 41.7 mg. of p-toluenesulfonic acid hydrate in 3 ml. of anhydrous benzene (dried by azeotropic distillation) is refluxed for 1 hour. The reaction mixture is diluted with ice-water, extracted with dichloromethane, washed with water, dried over anhydrous sodium sulfate, and evaporated to dryness to give 68 mg. of 4-desethyl-18-p-toluenesulfonyloxyibogamine lactam (IR: $\nu_{max.}^{CHCl_3}$ 3455, 1634, 1408, 1173, 966, 911, 898, 883 cm.$^{-1}$)

According to the same procedure, the treatment of 2-(5-methoxyindoleacetyl)isoquinuclidin-6-one or 2-(5,6-dimethoxyindoleacetyl)isoquinuclidin-6-one affords 4 - desethyl-18-p-toluenesulfonyloxyibogaine lactam or 4-desethyl - 18 - p - toluenesulfonyloxyibogaline lactam, respectively.

(d) A solution of 204 mg. of 4-desethyl-18-p-toluenesulfonyloxyibogamine lactam and 262 mg. of sodium methoxide in 10 ml. of anhydrous methanol is refluxed overnight under nitrogen atmosphere. The reaction mixture is diluted with ice-water, extracted with dichloromethane, washed with water, dried and evaporated to dryness to give 155 mg. of crude b-desethyl-18-methoxyibogamine lactam, which on recrystallization from acetone-dichloromethane affords 84 mg. of the crystals having M.P.>290° C.

(IR: $\nu_{max.}^{Nujol}$ 3182, 1630, 1091, 1068, 741 cm.$^{-1}$

Analysis.—Calcd. for $C_{18}H_{20}N_2O_2$ (percent): C, 72.95; H, 6.80; N, 9.45. Found (percent): C, 72.05; H, 6.75; N, 9.52.

According to the same procedure, the treatment of 4-desethyl-18-p-toluenesulfonyloxyibogaine lactam or 4-desethyl-18-p-toluenesulfonyloxyibogaline with sodium methoxide affords 4-desethyl-18-methoxyibogaine lactam or 4-desethyl-18-methoxyibogaline lactam, respectively.

(e) To a solution prepared by dissolving 58 mg. of 4-desethyl-18-methoxyibogamine lactam in anhydrous tetrahydrofuran under ice-cooling is added 58 mg. of lithium aluminum hydride under nitrogen atmosphere, and the solution is stirred at room temperature for 1.5 hours. Water is added and the mixture is filtered. The filtrate is concentrated under reduced pressure and the resulting crude material (54 mg.) is chromatographed on alumina. Elution (36 mg.) with benzene is crystallized from acetone to give 23 mg. of 4 - desethyl-18-methoxy-7,8-dehydroibogamine as plates having M.P. 216–218° C.

UV: $\lambda_{max.}^{EtOH}$ 235 (ε 23,170), 283 (12,550) mμ; $\lambda_{max.}^{HCl-EtOH}$ 222 (ε 33,800), 281 (8,720) mμ. IR: $\nu_{max.}^{CHCl_3}$ 3420, 1619, 1466, 1087, 1051 cm.$^{-1}$ Analysis.—Calcd. for $C_{18}H_{20}N_2O \cdot \frac{1}{2}H_2O$ (percent): C, 74.71; H, 7.32; N, 9.68. Found (percent): C, 74.11; H, 7.01; N, 9.71.

According to the same procedure, 4-desethyl-18-methoxyibogaine lactam is converted to 4 - desethyl-18-methoxy-7,8-dehydroibogaine, and 4-desethyl-18-methoxyibogaline lactam to 4-desethyl-18-methoxy-7,8-dehydroibogaline, respectively.

(f) A solution of 10 mg. of 4-desethyl-18-methoxy-7,8-dehydroibogamine in 10 ml. of ethyl acetate is shaken with 10 mg. of 10% palladium-charcoal in hydrogen atmosphere for 20 minutes. The reaction mixture is filtered and the filtrate is evaporated under reduced pressure to give 10 mg. of crude 4-desethyl-18-methoxyibogamine, which on crystallization from methanol affords 5 mg. of pure crystals having M.P. 193–195° C.

UV: $\lambda_{max.}^{EtOH}$ 226 (ε 33,400), 285 (8,100), 293 (6,730) mμ
IR: $\nu_{max.}^{CHCl_3}$ 3449, 1620, 1464, 1057 cm.$^{-1}$.

Analysis.—Calcd. for $C_{18}H_{22}N_2O$ (percent): C, 76.56; H, 7.85; N, 9.92. Found (percent): C, 76.56; H, 7.91; N, 9.77.

According to the same procedure, 4-desethyl-18-methoxy-7,8-dehydroibogaine is converted to 4-desethyl-18-methoxyibogaine, and 4 - desethyl-18-methoxy-7,8-dehydroibogaline to 4-desethyl-18-methoxyibogaline, respectively.

(g) A solution of 5 mg. of 4 - desethyl-18-methoxyibogamine in 2 ml. of anhydrous ether is refluxed with 5 mg. of lithium aluminum hydride for 1 hour under nitrogen atmosphere. Water is added and the resulting mixture is filtered. The filtrate is evaporated under reduced pressure to give a crude material, which on crystallization from acetone-methanol affords desethylibogamine having M.P. 184–186° C.

UV: $\lambda_{max.}^{EtOH}$ 228 (ε 33,600), 284 (7,250), 291 (6,860) mμ
IR: $\nu_{max.}^{CHCl_3}$ 3453, 1620, 1454, 1335 cm.$^{-1}$.

Analysis.—Calcd. for $C_{17}H_{20}N_2$ (percent): C, 80.91; H, 7.99; N, 11.10. Found (percent): C, 80.92; H, 7.88; N, 11.27.

According to the same procedure, 4 - desethyl-18-methoxyibogaine is converted to 4-desethylibogaine, and 4-desethyl-18-methoxyibogaline to 4-desethylibogaline, respectively.

(h) A solution of 32 mg. of 2-indoleacetylisoquinuclidin-6-one in conc. hydrochloric acid-methanol mixture (conc. hydrochloric acid: 23% by volume) is heated at 60–70° C. for 18 hours under increasing pressure. Solvent is removed off and the residue is alkalinified with dilute sodium bicarbonate aqueous solution and then extracted with dichloromethane. The extract is washed with water, dried, and evaporated under reduced pressure to give 43 mg. of a crystalline material, which on recrystallization from dichloromethane-ether affords 11 mg. of 4-desethyl-18-methoxyibogamine lactam as prisms having M.P. >290° C.

RI: $\nu_{max.}^{CHCl_3}$ 3440, 1642, 1090, 1053. cm.$^{-1}$

Analysis.—Calcd. for $C_{18}H_{20}O_2N_2$ (percent): C, 72.95; H, 6.80; N, 9.45. Found (percent): C, 72.05; H, 6.75; N, 9.52.

According to the same procedure, 2-(5-methoxyindoleacetyl)isoquinuclidin-6-one is converted to 4-desethyl-18-methoxy-ibogaine lactam, and 2-(5,6-dimethoxyindoleacetyl)isoquinuclidin-6-one to 4-desethyl-18-methoxyibogaline lactam, respectively.

EXAMPLE 2

(a) To a solution of 880 mg. of 3-ethyl-1-azatricyclo-[3.2.1.0$^{2,7}$]octane in 2 ml. of anhydrous ether is added a solution of indoleactic acid anhydride in anhydrous acetone (2.98 g./15 ml.) under ice-cooling and the mixture is allowed to stand at the same temperature for 30 minutes and then at room temperature for 3 hours under stirring. The reaction mixture is diluted with ice-water, and then extracted with dichloromethane. The extract is dried over anhydrous sodium sulfate and evaporated under reduced pressure to give 3.78 g. of crude 2-indoleacetyl-7-ethyl-6-indoleacetyloxyisoquinuclidine as a reddish brown oily material.

A mixture of this crude material and 12 ml. of 4 N-potassium carbonate aqueous solution in 50 ml. of methanol is refluxed for 2 hours under nitrogen atmosphere. The reaction mixture is concentrated under reduced pressure, diluted with water, and then extracted with dichloromethane. The extract is washed with water, dried over anhydrous sodium sulfate, and evaporated under reduced pressure to give 1.2 g. of reddish brown oily material, which on crystallization from dichloromethane-ether affords 426 mg. of 2-indoleacetyl-7-ethylisoquinuclidin-6-ol having M.P. 180–183° C. On the other hand, the mother liquid is chromatographed on neutral alumina and the elution with dichloromethane-methanol (95:5) affords 75 mg. of the same crystals.

*Analysis.*—Calcd. for $C_{19}H_{24}N_2O_2$ (percent): C, 73.04; H, 7.74; N, 8.97. Found (percent): C, 72.35; H, 7.66; N, 8.56.

According to the same procedure, the reaction of 3-ethyl-1-azatricyclo[3.2.1.0$^{2.7}$]octane with the corresponding amount of 5-methoxyindoleacetic acid anhydride or 5,6-dimethoxyindoleacetic acid anhydride in the presence of potassium carbonate affords, via 2-(5-methoxyindoleacetyl) - 7 - ethyl-6-(5-methoxyindoleacetyloxy)isoquinuclidine or 2-(5,6-dimethoxyindoleacetyl)-7-ethyl-6-(5,6-dimethoxyindoleacetyloxy)isoquinuclidine, 2-(5-methoxyindoleacetyl) - 7 - ethylisoquinuclidin-6-ol or 2-(5,6-dimethoxyindoleacetyl)-7-ethylisoquinuclidin-6-ol, respectively.

(b) To a solution prepared by dissolving 422 mg. of 2-indoleacetyl-7-ethylisoquinuclidin-6-ol in 50 ml. of anhydrous toluene and 12 ml. of cyclohexanone under warming and then by distilling a portion of the solvent as azeotrope to dry the reaction medium, is added a solution of aluminum isopropoxide in anhydrous toluene (414 mg./10 ml.), and the mixture is refluxed for 45 minutes. The reaction mixture is diluted with ice-dilute hydrochloric acid mixture and then extracted with dichloromethane. The extract is washed with water, dried over anhydrous sodium sulfate, and evaporated to give 1.88 g. of oily material, which is chromatographed on 15 g. of neutral alumina. Elution with benzene-dichloromethane (4:1) to dichloromethane-methanol (99.5:0.5) affords 330 mg. of 2-indoleacetyl-7-ethylisoquinuclidin-6-one (IR: $\nu_{max.}^{CHCl_3}$ 3476, 1738, 1639, cm.$^{-1}$)

and the elution with dichloromethanemethanol (99:1 to 95:5) affords 72 mg. of the starting 2-indoleacetyl-7-ethylisoquinuclidin-6-ol.

According to the same procedure, 2-(5-methoxyindoleacetyl)-7-ethylisoquinuclidin-6-ol is converted to 2-(5-methoxyindoleacetyl)-7-ethylisoquinuclidin-6-one, and 2-(5,6-dimethoxyindoleacetyl)-7-ethylisoquinuclidin-6-ol to 2-(5,6-dimethoxyindoleacetyl) - 7 - ethylisoquinuclidin-6-one, respectively.

(c) A solution of 325 mg. of 2-indoleacetyl-7-ethylisoquinuclidin-6-one and 220 mg. of p-toluenesulfonic acid hydrate in 30 ml. of anhydrous benzene (dried by azeotropic distillation) is refluxed for 4 hours under stirring. The reaction mixture is diluted with ice-water, extracted with dichloromethane, washed with water, dried over anhydrous sodium sulfate, and evaporated to dryness to give 412 mg. of 4-epi-18-p-toluenesulfonyloxyibogamine lactam as an oily material.

IR: $\nu_{max.}^{CHCl_3}$ 3426, 1636, 1405, 1173, 940, 918, 900, 880 cm.$^{-1}$

According to the same procedure, 2-(5-methoxyindoleacetyl)-7-ethylisoquinuclidin-6-one is converted to 4-epi-18-p-toluenesulfonyloxyibogaine lactam, and 2-(5,6-dimethoxyindoleacetyl) - 7 - ethylisoquinuclidin-6-one to 4-epi-18-p-toluenesulfonyloxyibogaline lactam, respectively.

(d) A solution of 409 mg. of 4-epi-18-p-toluenesulfonyloxyibogamine lactam and 475 mg. of sodium methoxide in 40 ml. of anhydrous methanol is refluxed for 16 hours under nitrogen atmosphere. The reaction mixture is diluted with ice-water and extracted with dichloromethane, and the extract is washed with water, dried, and evaporated to dryness to give 323 mg. of crude 4-epi-18-methoxyibogamine lactam, which on crystallization from methanol affords 98 mg. of pure crystals having M.P. 286–293° C. On the other hand, the mother liquid is chromatographed on 7 g. of neutral alumina, and the elution with benzene to benzene-dichloromethane (8:2) affords 34 mg. of the same crystals.

IR: $\nu_{x}^{CHCl_3}$ 3442, 1645, 1410, 1306, 1093, 1083, 1067 cm.$^{-1}$

*Analysis.*—Calcd. for $C_{20}H_{24}N_2O_2$ (percent): C, 74.04; H, 7.46; N, 8.64. Found (percent): C, 73.75; H, 7.48; N, 8.61.

According to the same procedure, 4-epi-18-p-toluenesulfonyloxyibogaine lactam is converted to 4-epi-18-methoxyibogaine lactam, and 4-epi-18-p-toluenesulfonyloxybogaline lactam to 4-epi-18-methoxyibogaline lactam, respectively.

(e) To a solution of 50 mg. of lithium aluminum hydride in 10 ml. of anhydrous ether is added dropwise a solution of 50 mg. of 4-epi-18-methoxyibogamine lactam in 10 ml. of anhydrous tetrahydrofuran under nitrogen atmosphere and ice cooling. The mixture is stirred overnight at room temperature and then cooled with ice. Water is added and, after being filtered, the filtrate is dried over anhydrous sodium sulfate and evaporated to give 54 mg. of crude 4-epi-18-methoxy-7,8-dehydroibogamine, which is chromatographed on alumina. Elution with petroleum ether-benzene (4:1 to 1:1) is recrystallized from methanol to give 15 mg. of pure crystals having M.P. 186–188° C.

UV: $\lambda_{max.}^{EtOH}$ 234 ($\epsilon$ 21,110), 244 (shoulder), 285 (12,460) m$\mu$. IR: $\nu_{max.}^{CHCl_3}$ 3440, 1620, 1467, 1400, 1370, 1050 cm.$^{-1}$

*Analysis.*—Calcd. for $C_{20}H_{24}N_2O$ (percent): C, 77.88; H, 7.84; N, 9.08. Found (percent): C, 78.07; H, 7.93; N, 8.80.

According to the same procedure, 4-epi-18-methoxyibogaine lactam is converted to 4-epi-18-methoxy-7,8-dehydroibogaine, and 4-epi-18-methoxyibogaline to 4-epi-18-methoxy-7,8-dehydroibogaline, respectively.

(f) A solution of 10 mg. of 4-epi-18-methoxy-7,8-dehydroibogamine in 4 ml. of ethyl acetate is shaken with 10 mg. of 10% paladium-charcoal for about 1 hour at room temperature. The catalyst is filtered off and the filtrate is evaporated to dryness to give 10 mg. of crude material, which on crystallization from methanol affords 4 mg. of 4-epi-18-methoxyibogamine having M.P. 131–135° C.

IR: $\nu_{max.}^{CHCl_3}$ 3440, 1460, 1058 cm.$^{-1}$

According to the same procedure, 4-epi-18-methoxy-7,8-dehydroibogaine is converted to 4-epi-18-methoxyibogaine, and 4-epi-18-methoxy-7,8-dehydroibogaline to 4-epi-18-methoxyibogaline, respectively.

(g) A solution of 4 mg. of 4-epi-18-methoxyibogamine and 4 mg. of lithium aluminum hydride in anhydrous ether is refluxed for 1 hour under nitrogen atmosphere and stirring. An excess of reagent is killed with a small amount of water and the solution is filtered, dried over anhydrous sodium sulfate, and evaporated to dryness to give 4 mg. of crude material, which on recrystallization from acetone affords 2 mg. of 4-epi-ibogamine as pure crystals having M.P. 195–197° C.

IR: $\nu_{max}^{CHCl_3}$ 3440, 1460 cm.$^{-1}$

*Analysis.*—Calcd. for $C_{19}H_{24}N_2$ (percent): C, 81.38; H, 8.63; N, 9.99. Found (percent): C, 81.37; H, 8.48; N, 10.42.

According to the same procedure, 4-epi-18-methoxyibogaine is converted to 4-epi-ibogaine, and 4-epi-18-methoxyibogaline to 4-epi-ibogaline, respectively.

EXAMPLE 3

(a) To a solution of 900 mg. of 3-ethyl-1-azatricyclo-[3.2.1.0$^{2.7}$]octane in 2 ml. of anhydrous ether is added a solution of indoleacetic acid anhydride in anhydrous acetone (3.3 g./15 ml.) under ice-cooling, and the solution is allowed to stand for 30 minutes at the same temperature and then stirred for 4 hours at room temperature. The reaction mixture is diluted with ice-water, and extracted with dichloromethane. The extract is washed with water, dried, and evaporated to dryness to give 3.68 g. of 2-indoleacetyl-7-ethyl-6-indoleacetyloxy-isoquinuclidine as a reddish brown oily material.

A solution of the above-described compound in 45 ml. of methanol is mixed with 15 ml. of 2 N-potassium carbonate aqueous solution and refluxed for 2 hours under nitrogen atmosphere. The reaction mixture is concentrated under reduced pressure, diluted with water, and extracted with dichloromethane, and the extract is washed with water, dried, and evaporated to dryness to give 1.08 g. of crude material, which on crystallization from dichloromethane-ether affords 268 mg. of 2-indoleacetyl-7-ethylisoquinuclidin-6-ol as plates having M.P. 206–208° C. Furthermore, the resulting mother liquid is chromatographed on neutral alumina and the elution with dichloromethane-methanol (95:5) affords 20 mg. of the same crystals.

*Analysis.*—Calcd. for $C_{19}H_{24}N_2O_2$ (percent): C, 73.04; H, 7.74; N, 8.97. Found (percent): C, 72.77; H, 7.91; N, 8.60.

According to the same procedure, the reaction of 3-ethyl-1-azatricyclo[3.2.1.0$^{2.7}$]octane with the corresponding amount of 5-methoxyindoleacetic acid anhydride or 5,6-dimethoxyindoleacetic acid anhydride affords respectively 2-(5-methoxyindoleacetyl) - 7 - ethyl-6-(5-methoxyindoleacetyloxy)isoquinuclidine or 2-(5,6-dimethoxyindoleacetyl)-7-ethyl-6-(5,6 - dimethoxyindoleacetyloxy) isoquinuclidine, which on hydrolysis with potassium carbonate in the usual manner affords 2-(5-methoxyindoleacetyl)-7-ethylisoquinuclidin-6-ol or 2-(5,6-dimethoxyindoleacetyl)-7-ethylisoquinuclidin-6-ol, respectively.

(b–i) To a solution prepared by dissolving 508 mg. of 2-indoleacetyl-7-ethylisoquinuclidin-6-ol in 50 ml. of anhydrous toluene and 15 ml. of cyclohexanone under warming and then by distilling off a portion of the solvent as azeotrope to dry the reaction medium, is added a solution of aluminum isopropoxide in anhydrous toluene (498 mg./10 ml.), and the mixture is refluxed for 55 minutes. The reaction mixture is diluted with dilute hydrochloric acid and extracted with dichloromethane, and the extract is washed with water, dried, and evaporated to give 2-indoleacetyl-7-ethylisoquinuclidin-6-one as an oily material, which on alumina chromatography affords 362 mg. of pure oily material and 50 mg. of starting material.

According to the same procedure, 2-(5-methoxyindoleacetyl)-7-ethylisoquinuclidin-6-ol is converted to 2-(5-methoxyindoleacetyl)-7-ethylisoquinuclidin - 6 - one, and 2-(5,6-dimethoxyindoleacetyl) - 7 - ethylisoquinuclidin-6-ol to 2-(5,6 dimethoxyindoleacetyl)-7-ethylisoquinuclidin-6-one, respectively.

(b–ii) A solution of 450 mg. of 2-indoleacetyl-7-ethyl-isoquinuclidin-6-ol in 4.5 ml. of dimethyl sulfoxide and 2.9 ml. of acetic anhydride is stirred for 17 hours at room temperature. Thereafter, 2.9 ml. of 99% ethanol is added under ice-cooling and the solution is stirred for an additional hour, then diluted with ice-water, basified with ammonia, and extracted with dichloromethane. The extract is washed with water, dried and evaporated to dryness to give 508 mg. of 2-indoleacetyl-7-ethylisoquinuclidin-6-one as an amorphous.

IR: $\nu_{max}^{CHCl_3}$ 3490, 1735, 1635, 1410, 1093 cm.$^{-1}$ (c–i) A solution of 279 mg. of 2-indoleacetyl-7-ethyl-isoquinuclidin-6-one and 200 mg. of p-toluenesulfonic acid hydrate in 30 ml. of anhydrous benzene(dried by azeotropic distillation) is refluxed for 4 hours under stirring. The reaction mixture is diluted with ice-water and extracted with dichloromethane, and the extract is washed with water, dried, and evaporated to dryness to give 378 mg. of 18-p-toluenesulfonyloxyibogamine lactam as a oily material.

According to the same procedure, 2-(5-methoxyindoleacetyl)-7-ethylisoquinuclidin-6-one is converted to 18-p-toluenesulfonyloxyibogaine lactam, and 2-(5,6-dimethoxyindoleacetyl)-7-ethylisoquinuclidin-6-one to 18-p-toluenesulfonyloxyibogaline lactam, respectively.

(c–ii) A solution of 310 mg. of 2-indoleacetyl-7-ethyl-isoquinuclidin-6-one and 258 mg. of anhydrous p-toluenesulfonic acid in 25 ml. of anhydrous benzene (dried by azeotropic distillation) is heated under stirring and argon atmosphere for 5 minutes during which time a portion of the solvent is distilled off as azeotropic mixture. After cooling, the reaction mixture is diluted with ice-water and extracted with dichloromethane. The extract is washed with dilute sodium bicarbonate solution and then with water, dried and evaporated to dryness to give 422 mg. of 18-p-toluenesulfonyloxyibogamine lactam as an amorphous.

IR: $\nu_{max}^{CHCl_3}$ 3480, 1640, 1410, 1365, 1175 cm.$^{-1}$ (c–iii) A solution of 50 mg. of 2-indoleacetyl-7-ethyl-isoquinuclidin-6-one and 36 mg. of anhydrous p-toluene-sulfonic acid in 8 ml. of anhydrous dichloromethane (free from ethanol) is dried by distilling a portion of the solvent as azeotrope, and then refluxed for 14 hours. Thereafter, the reaction mixture is treated according to the same procedure as (c-ii) to give 49 mg. of residue, which on purification by thin layer chromatography affords 9.5 mg. of 18-p-toluenesulfonyloxyibogamine lactam and 13.8 mg. of 18-p-toluenesulfonyloxy-4-epi-ibogamine lactam.

(d–i) A solution of 305 mg. of 18-p-toluenesulfonyl-oxyibogamine lactam and 368 mg. of sodium methoxide in 30 ml. of anhydrous methanol is refluxed for 15 hours under nitrogen atmosphere. The reaction mixture is diluted with ice-water, and extracted with dichloromethane, and the extract is washed with water, dried, and evaporated to dryness to give 282 mg. of crude 18-methoxyibogamine lactam, which on crystallization from methanol affords 111 mg. of pure crystals having M.P. 283–285° C.

*Analysis.*—Calcd. for $C_{20}H_{24}N_2O_2$ (percent): C, 74.04; H, 7.46; N, 8.64. Found (percent): C, 73.36; H, 7.42; N, 8.26.

According to the same procedure, 18-p-toluenesulfonyl-oxyibogaine lactam is converted to 18-methoxyibogaine lactam, and 18-p-toluenesulfonyloxyibogaline lactam to 18-methoxyibogaline lactam, respectively.

(d–ii) To a solution of 64 mg. of 18-p-toluenesulfonyl-oxyibogamine lactam in 5 ml. of anhydrous methanol is added portion-wise (4 portions) 256 mg. (total) of sodium borohydride at 20 min. intervals under refluxing. The reaction is continued for 30 minutes after completion of the addition of the reagent. The reaction mixture is cooled, diluted with ice-water, and extracted with dichloromethane. The extract is washed with water, dried and evaporated to dryness to give 51 mg. of crude 18-methoxyibogamine lactam as an oily material, which on crystallization from methanol and thin layer chromatography (Kieselguhr-G) of the mother liquid affords total 15.1 mg. of pure crystals.

(e-i) To a solution of 50 mg. of lithium aluminum hydride in 10 ml. of anhydrous ether is added dropwise a solution of 50 mg. of 18-methoxyibogamine lactam in 10 ml. of anhydrous tetrahydrofuran. The mixture is stirred overnight at room temperature. Water is added and, after being filtered, the filtrate is dried and evaporated to dryness to give 53 mg. of crude 18-methoxy-7,8-dehydroibogamine, which is chromatographed on alumina. Elution with petroleum ether-benzene or petroleum ether-ether, on recrystallization from methanol, affords 17 mg. of pure crystals having M.P. 185–187° C.

According to the same procedure, 18-methoxyibogaine lactam is converted to 18-methoxy-7,8-dehydroibogaine, and 18-methoxyibogaline lactam to 18-methoxy-7,8-dehydroibogaline, respectively.

(e-ii) A solution of 145 mg. of 18-methoxyibogamine lactam and 144 mg. of lithium aluminum hydride in 40 ml. of anhydrous tetrahydrofuran is refluxed for 1 hour. To the reaction mixture hydrous tetrahydrofuran is added under ice-cooling to kill an excess of lithium aluminum hydride. The mixture is filtered and the filtrate is evaporated to dryness under reduced pressure to give 140 mg. of crude crystals which on recrystallization from petroleum ether-ether afford 7$\xi$-hydroxy-18-methoxyibogamine as pure crystals having M.P. 175–178° C.

IR: $\nu_{max.}^{Nujol}$ 3340, 1050, 1018, 985 cm.$^{-1}$

*Analysis.*—Calcd. for $C_{20}H_{26}O_2N_2$ (percent): C, 73.59; H, 8.03; N, 8.58. Found (percent): C, 73.62; H, 7.87; N, 8.69.

A solution of 50 mg. of the resulting crude 7$\xi$-hydroxy-18-methoxyibogamine in benzene is adsorbed over 2 g. of 3% hydrous neutral alumina and left for 2 days. Thereafter, the fractions eluted with benzene are collected and evaporated to dryness to give 25 mg. of 18-methoxy-7,8-dehydroibogamine which on recrystallization from ether affords pure crystals having M.P. 185–188° C.

(f) A solution of 10 mg. of 18-methoxy-7,8-dehydroibogamine in 5 ml. of ethyl acetate is shaken with 10 mg. of 10% palladium-charcoal for 1 hour at room temperature. The catalyst is filtered off, and the filtrate is evaporated to dryness to give 10 mg. of crude material, which on recrystallization from methanol affords 5 mg. of 18-methoxyibogamine as crystals having M.P. 135–145° C.

According to the same procedure, 18-methoxy-7,8-dehydroibogaine is converted to 18-methoxyibogaine, and 18-methoxy-7,8-dehydroibogaline to 18-methoxyibogaline, respectively.

(g) A solution of 5 mg. of 18-methoxyibogamine and 5 mg. of lithium aluminum hydride in 4 ml. of anhydrous ether is refluxed for 1 hour under nitrogen atmosphere and stirring. Water is added, and after being filtered, the filtrate is dried and evaporated to give 5 mg. of crude material, which on recrystallization from acetone-methanol affords 2 mg. of ibogamine as pure crystals having M.P. 121–124° C.

According to the same procedure, 18-methoxyibogaine, is converted to ibogaine, and 18-methoxyibogaline to ibogaline, respectively.

EXAMPLE 4

To a solution of 333 mg. of 18-p-toluenesulfonyloxy-4-desethylibogamine lactam in 15 ml. of anhydrous tetrahydrofuran is added a solution of diisobutyl aluminum hydride in tetrahydrofuran (1.39 mmol/ml.) (5.2 ml.) under ice-cooling and nitrogen atmosphere, and the mixture is stirred for 1 hour. Thereafter, the reaction mixture is diluted with ice-cooled dilute sodium hydroxide aqueous solution and then extracted with dichloromethane. The extract is washed with water, dried and evaporated under reduced pressure to give 248 mg. of residue, which is chromatographed on 8 g. of alumina. Elution with petroleum ether-benzene (1:1) is recrystallized from ether to give 32 mg. of 7,8-dehydro-4-desethylibogamine having M.P. 168–170° C.

UV: $\lambda_{max.}^{95\% EtOH}$ 242.5 ($\epsilon$ 23,700), 283.5 (13,400) m$\mu$;

$\lambda_{max.}^{2 N-HCl \cdot EtOH}$ 224 ($\epsilon$37,000), 282.5 (10,650) m$\mu$. IR: $\nu_{max.}^{CCl_4}$ 3460, 1620, 1465, 1375, 1330, 1287, 1068 cm.$^{-1}$ Elution with benzene-dichloromethane (4:1) is recrystallized from acetone to give 27 mg. of 4-desethylibogamine having M.P. 186.5–188° C.

A solution of the above-described 7,8-dehydro-4-desethylibogamine (10 mg.) in 3 ml. of methanol is shaken with 20 mg. of 10% palladium-charcoal under hydrogen atmosphere for 1 hour. The reaction mixture is filtered, and the filtrate is evaporated to dryness under reduced pressure to give 10 mg. of crude material, which on recrystallization from acetone affords 6 mg. of 4-desethylibogamine having M.P. 183–184° C.

According to the same procedure, 4-desethyl-18-p-toluenesulfonyloxyibogaine lactam is converted to 7,8-dehydro-4-desethylibogaine and/or 4-desethylibogaine, and 4-desethyl-18-p-toluenesulfonyloxyibogaline lactam to 7,8-dehydro-4-desethylibogaline and/or 4-desethylibogaline, respectively.

EXAMPLE 5

To a solution of 422 mg. of 18-p-toluenesulfonyloxy-ibogamine lactam in 15 ml. of anhydrous tetrahydrofuran is added a solution of diisobutyl aluminum hydride in tetrahydrofuran (1.39 mmol/ml.) (7.1 ml.) under ice-cooling, and the solution is stirred for 1 hour at the same temperature. The reaction mixture is diluted with ice-water and extracted with dichloromethane. The extract is washed with dilute sodium carbonate aqueous solution and then with water, dried, and evaporated under reduced pressure to give 301 mg. of residue, which is chromatographed on alumina. Elution with petroleum ether-benzene (10:1–9:1) affords 33 mg. of 7,8-dehydroibogamine as an amorphous material.

UV: $\lambda_{max.}^{EtOH}$ 230 ($\epsilon$ 16,900), 286 (8,930) m$\mu$; $\lambda_{max.}^{2N-HCl \cdot EtOH}$ 223 ($\epsilon$26,000), 283 (7,800), 290 (7,200) m$\mu$. IR: $\nu_{max.}^{CHCl_3}$ 3460, 1618, 1465, 1093 cm.$^{-1}$ Elution with petroleum ether-benzene (7:1) to benzene affords 28.6 mg. of crude crystals, which on recrystallization from ether-petroleum ether affords 18.6 mg. of ibogamine having M.P. 125–128° C.

The above-described 7,8-dehydroibogamine (10 mg.) is catalytically hydrogenated according to the same procedure as Example 4, and the product is recrystallized from ether to give 5 mg. of ibogamine having M.P. 120–123° C.

The above-described 7,8-dehydroibogamine (10 mg.) is catalytically hydrogenated according to the same procedure as Example 4, and the product is recrystallized from ether to give 5 mg. of ibogamine having M.P. 120–123° C.

According to the same procedure, 18-p-toluenesulfonyloxyibogaine lactam is converted to 7,8-dehydroibogaine and/or ibogaine, 18-p-toluenesulfonyloxyibogaline lactam to 7,8-dehydroibogaline and/or ibogaline, 18-methanesulfonyloxy-4-epi-ibogamine lactam to 7,8-dehydro-4-epi-ibogamine and/or 4-epi-ibogamine, 18-methanesulfonyloxy-4-epi-ibogaine lactam to 7,8-dehydro-4-epi-ibogaine and/or 4-epi-ibogaine, and 4-epi-18-methanesulfonyloxyibogaline lactam to 7,8-dehydro-4-epi-ibogaline and/or 4-epi-ibogaline, respectively.

EXAMPLE 6

To a solution of 310 mg. of 2-indoleacetyl-7-ethyl-isoquinuclidin-6-one in 30 ml. of anhydrous benzene (dried by distilling as azeotropic mixture) is added 258 mg. of anhydrous p-toluenesulfonic acid, and the resulting solution is refluxed under stirring and nitrogen atmosphere for 5 minutes during which time benzene is distilled slowly as azeotrope. The reaction mixture is rapidly cooled, poured into ice-cooled 7% sodium bicarbonate solution and then extracted with dichloromethane. The extract is washed with water, dried over anhydrous sodium sulfate, and evaporated to dryness under reduced pressure to give 420 mg. of 18-p-toluenesulfonyloxyibogamine lactam as a crude oily material. This oily material is dissolved in 12 ml. of anhydrous tetrahydrofuran. To the solution 16 ml. of ethereal solution prepared from lithium aluminum hydride (1.09 g.), aluminum chloride (1.26 g.), and anhydrous ether (70 ml.) (a mixture consisting of $AlH_3$, $AlClH_2$, and $AlCl_2H$) is added at —70° C. (Dry Ice-acetone) under stirring and nitrogen atmosphere over a period of 5 minutes. The reaction mixture is stirred for additional 30 minutes under ice-cooling, then poured into ice-cooled 2 N-sodium hydroxide solution to kill an excess of reagent and then extracted with ether. The extract is washed with water, dried over anhydrous sodium sulfate, and evaporated to dryness under reduced pressure to give 320 mg. of light yellow oily material which is chromatographed on 8 g. of 3%-neutral alumina (Woelm). Elution with benzene is crystallized from ether-petroleum ether to give 103.2 mg. of ibogamine having M.P. 120–130° C.

What we claim is:

1. A compound of the formula

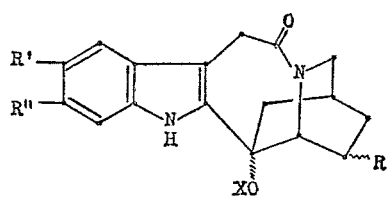

wherein R is hydrogen or lower alkyl, R' and R" are the same or different and each is hydrogen or lower alkoxy and X is p-toluenesulfonyl or lower alkyl.

2. A compound according to claim 1, namely, 4-desethyl-8-p-toluenesulfonyloxyibogamine lactam.
3. A compound according to claim 1, namely, 4-epi-18-p-toluenesulfonyloxyibogamine lactam.
4. A compound according to claim 1, namely, 18-p-toluenesulfonyloxyibogamine lactam.
5. A compound according to claim 1, namely, 4-desethyl-8-p-toluenesulfonyloxyibogaine lactam.
6. A compound according to claim 1, namely, 4-desethyl-18-p-toluenesulfonyloxyibogaline lactam.
7. A compound according to claim 1, namely, 4-epi-18-p-toluenesulfonyloxyibogaine lactam.
8. A compound according to claim 1, namely, 4-epi-18-p-toluenesulfonyloxyibogaline lactam.
9. A compound according to claim 1, namely, 18-p-toluenesulfonyloxibogaine lactam.
10. A compound according to claim 1, namely, 18-p-toluenesulfonyloxyibogaline lactam.

References Cited
UNITED STATES PATENTS 3,516,989  6/1970  Sallay _____ 260—239
3,557,126  1/1971  Sallay _____ 260—293
3,574,220  4/1971  Sallay _____ 260—294.7

OTHER REFERENCES

Nagata et al., J. Am. Chem. Soc. 89 (19), 5046–8 (1967).

Büchi et al., J. Am. Chem. Soc. 87 (9), 2073–5 (1965).

HENRY R. JILES, Primary Examiner
G. T. TODD, Assistant Examiner